US011314643B2

(12) United States Patent
Walker

(10) Patent No.: US 11,314,643 B2
(45) Date of Patent: Apr. 26, 2022

(54) ENHANCED DUPLICATE WRITE DATA TRACKING FOR CACHE MEMORY

(71) Applicant: Micron Technology, Inc., Boise, ID (US)

(72) Inventor: Robert M. Walker, Raleigh, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/934,837

(22) Filed: Jul. 21, 2020

(65) Prior Publication Data
US 2022/0027270 A1 Jan. 27, 2022

(51) Int. Cl.
*G06F 12/0806* (2016.01)
*G06F 12/0866* (2016.01)
*G06F 12/0891* (2016.01)
*G06F 12/0897* (2016.01)

(52) U.S. Cl.
CPC ...... *G06F 12/0806* (2013.01); *G06F 12/0866* (2013.01); *G06F 12/0891* (2013.01); *G06F 12/0897* (2013.01)

(58) Field of Classification Search
CPC .................................................. G06F 12/0806
USPC .......................................................... 711/118
See application file for complete search history.

(56) References Cited

U.S. PATENT DOCUMENTS

2003/0191916 A1* 10/2003 McBrearty .......... G06F 11/1464
711/162
2005/0021907 A1* 1/2005 Shimada ............. G06F 11/2015
711/113

* cited by examiner

*Primary Examiner* — Jae U Yu
(74) *Attorney, Agent, or Firm* — Lowenstein Sandler LLP

(57) ABSTRACT

A request to perform a write operation to write data at a memory sub-system is received. Responsive to the request to perform the write operation, the data is stored at a cache portion of cache memory of the memory sub-system. A duplicate copy of the data is stored at a write buffer portion of cache memory. An entry of the write buffer record is recorded that maps a location of the duplicate copy of the data stored at the write buffer portion to a location of the data stored at the cache portion of the cache memory. A memory operation is performed at the memory sub-system based at least in part on the write buffer record.

20 Claims, 6 Drawing Sheets

ENHANCED DUPLICATE WRITE DATA TRACKING FOR CACHE MEMORY

TECHNICAL FIELD

Embodiments of the disclosure relate generally to memory sub-systems, and more specifically, relate to duplicate data tracking for cache memory in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure.

DETAILED DESCRIPTION

Figure 1:
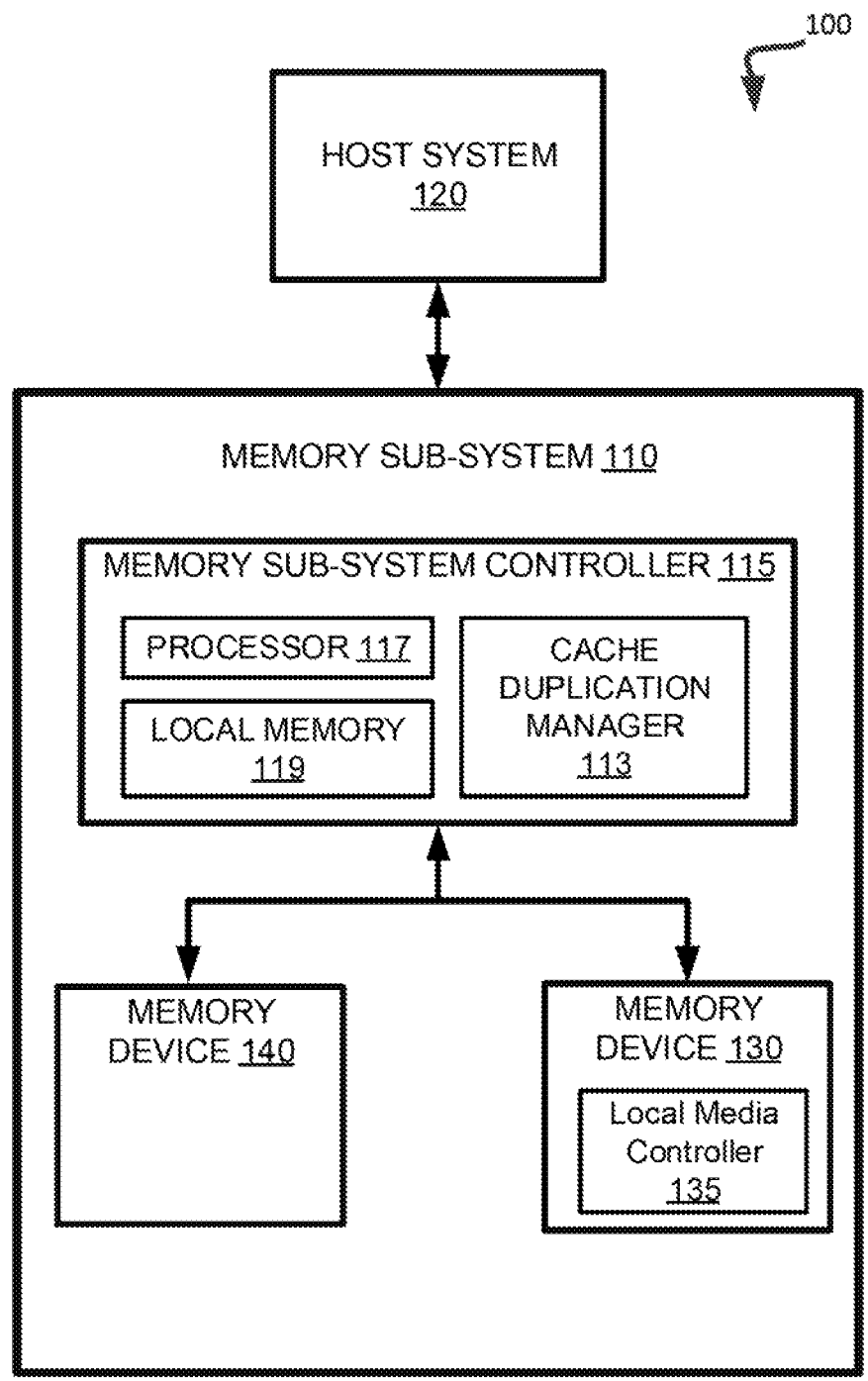
FIG. 1 illustrates an example computing system that includes a memory sub-system, in accordance with some embodiments of the disclosure.

Aspects of the disclosure are directed to duplicate data tracking for cache memory in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative-and (NAND) memory device. Other examples of non-volatile memory devices are described below in conjunction with FIG. 1. The memory sub-system can further include volatile memory devices, which can be used as cache memory. Cache memory can often be accessed more quickly than the non-volatile memory devices in a memory sub-system.

Often data that is frequently or recently accessed can be retrieved from backend memory (e.g., non-volatile memory) and stored at cache memory to take advantage of cache memory's low latency. Data stored at cache memory can undergo many state changes before the data is (re-) written to backend memory. Thus, the data stored at cache memory can become what is referred to as "dirty" data since it does not match the corresponding data stored at backend memory.

Some memory sub-systems are configured with high-reliability cache memory that has the ability to recover data lost from cache memory device failure. Some conventional memory sub-systems implement conventional techniques to achieve high-reliability cache memory. For example, a conventional memory system can have cache memory that includes a large number discrete cache memory devices. A large-sized segment of data can be divided into smaller pieces of data (e.g., 64 bytes) and written across the large number of discrete cache memory devices. Each of the smaller pieces of data written to a particular cache memory device can include error correcting code (ECC). If a discrete cache memory device fails, the piece of data stored at the failed cache memory device can be reconstructed using the ECC stored at the remaining cache memory devices. However, some memory sub-systems with particular architectures, such as those with a smaller number of cache memory devices, may not be able to support conventional high-reliability cache memory techniques. For instance, some memory sub-systems with a smaller number of cache memory devices may not have the enough cache memory devices to effectively distribute the smaller pieces of data across the cache memory devices such that data on a failed cache memory device can be reconstructed using the ECC stored at the remaining cache memory devices.

Aspects of the disclosure address the above and other deficiencies by partitioning a cache memory into a cache portion and a write buffer portion. Responsive to receiving a request to perform a write operation to write data at the memory sub-system, the write data is stored at the cache portion of the cache memory. A duplicate copy of the data can be stored at the write buffer portion of the cache memory. An entry of a write buffer record can be used to map the location of the duplicate copy of the data to the location of the corresponding write data. In some embodiments, the write data is stored at a cache line that is accessible using a channel, and the duplicate copy of the data is stored at a cache line that accessible using a different channel. By storing the write data and the corresponding duplicate copy of the data on cache lines accessible by different channels, the memory sub-system can recover the data stored at cache memory in situations where a channel fails.

A channel can refer to a physical coupling used to transmit data. In some embodiments, channels can be used to perform parallel operations on cache memory. In some embodiments, the two or more channels can be coupled to different dual in-line memory modules (DIMMs), different discrete memory devices, or different die of a discrete memory device (e.g., packaged in its own device package), for example.

In some embodiments, the write buffer record can be used to recover otherwise unrecoverable data stored at the cache portion of the cache memory after a failure (e.g., such as a failure of memory cell of a cache line, an entire cache line of a discrete cache memory device, a die of a discrete memory device, a discrete memory device, a dual in-line memory module, and so forth). Responsive to receiving the request to perform a read operation to read the data stored at the cache portion of the cache memory, the memory sub-system can attempt to read the data from the cache line of the cache portion of the cache memory. The memory sub-system can detect an unrecoverable error at the cache line of the cache portion. The memory sub-system can access the write buffer record to determine the location of the corresponding duplicate copy of the data stored at the write buffer portion of the cache memory. The duplicate copy of the data can be accessed using a different channel than the channel used to access the write data stored at the cache line of the cache portion. The memory sub-system can send the duplicate copy of the data to the host system responsive to the read request. In some embodiments, subsequent to detecting an unrecoverable error at the cache portion, the duplicate copy of data stored at the write buffer can be written to backend memory so that the backend memory has an up-to-date copy of the data and to ensure that the data has been duplicated. In some embodiments, the write buffer record can also be stored at the same channel as the duplicate copy of the data. By storing the write data and the corresponding write buffer record on different channels, the memory sub-system can also recover the write buffer record in situations where a particular channel fails.

By storing write data at a cache line (accessed using a channel) of a cache portion of cache memory and a duplicate copy of the data at a cache line (accessed using a different channel) of a write buffer portion of cache memory, and mapping the location of the write data to the location of the duplicate copy of the data using a write buffer record a memory sub-system can efficiently implement high-reliability cache memory. This reduces the likelihood that data will be lost in the event of a memory failure and allows for high-reliability without the need for a large number of discreet memory devices.

FIG. 1 illustrates an example computing system 100 that includes a memory sub-system 110 in accordance with some embodiments of the disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

In some embodiments, the memory sub-system 110 includes a cache duplication manager 113 that performs aspects of the disclosure. In some embodiments, a cache duplication manager 113 receives a request to perform a write operation to write data at a memory sub-system. Responsive to the request to perform the write operation, cache duplication manager 113 stores the data at a cache portion of cache memory of the memory sub-system. Cache duplication manager 113 stores a duplicate copy of the data at a write buffer portion of cache memory. Cache duplication manager 113 records, in a write buffer record, an entry that maps a location of the duplicate copy of the data stored at the write buffer portion to a location of the data stored at the cache portion of the cache memory. Cache duplication manager 113 performs a memory operation at the memory sub-system based at least in part on the write buffer record.

In some embodiments, cache duplication manager 113 receives a request to perform a write operation to write data at a memory sub-system. Responsive to the request to perform the write operation, cache duplication manager 113 stores the data at a first cache line of a cache portion of cache memory. The first cache line of the cache portion is accessible by a first channel. Cache duplication manager 113 allocates a second cache line of the cache portion of the cache memory to a write buffer portion of the cache memory. The second cache line of the write buffer portion is accessible by a second channel. Cache duplication manager 113 stores a duplicate copy of the data at a second cache line of the write buffer portion of cache memory. Cache duplication manager 113 records, in a write buffer record, an entry that maps a location of the duplicate copy of the data stored at the write buffer portion to a location of the data stored at the cache portion of the cache memory.

Figure 2:
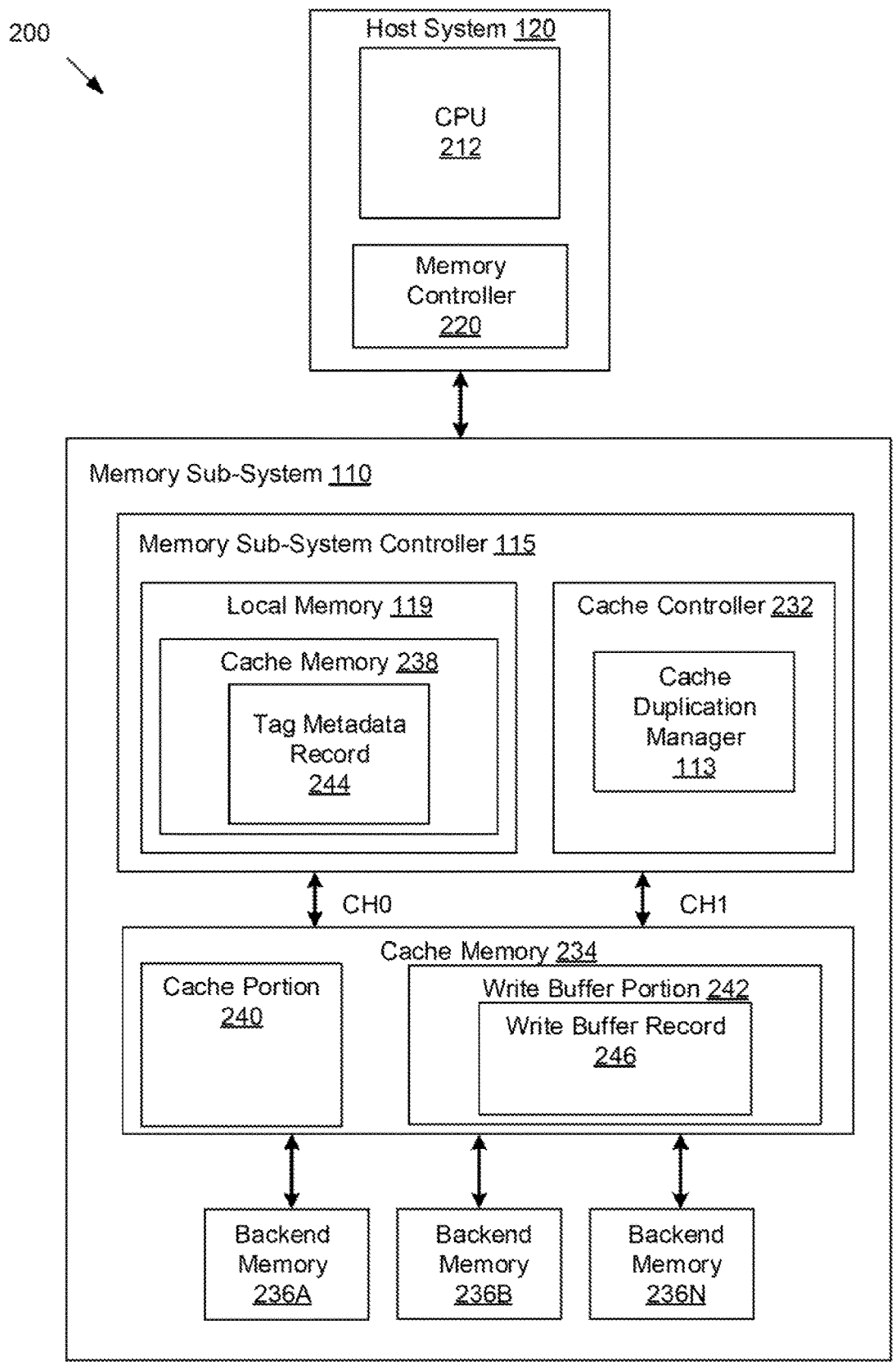
FIG. 2 depicts an example computing environment including a host system and a memory sub-system, in accordance with embodiments of the disclosure.

FIG. 2 depicts an example computing environment including a host system 120 and a memory sub-system 110, in accordance with embodiments of the disclosure. Elements and description with respect to FIG. 1 can apply to FIG. 2, unless otherwise described. System 200 shows host system 120 and memory sub-system 110.

In some embodiments, the host system 120 includes one or more processing devices, such as a central processing unit (CPU) 212 or graphics processing unit (GPU). The memory controller 220 of the host system 120 can send memory operations, including requests to perform read operations or write operations, to the memory sub-system 110. In some embodiments, a memory operation from the CPU 212 can request data of a particular size (e.g., 64 bytes).

The memory sub-system controller 115 of the memory sub-system 110 can include a cache controller 232 and local memory 119. Local memory 119 can include cache memory 238. Cache memory 238 can be integrated with cache controller 232 or a discrete device(s). In some embodiments, cache memory 238 includes SRAM. In some embodiments, cache memory 238 can be a higher level of cache memory than cache memory 234 with respect to memory sub-system controller 115, and in particular with respect to cache controller 115. For example, cache memory 238 can be level 1 cache memory and cache memory 234 can be level 2 cache memory. Higher levels of cache memory allow for quicker data access to frequently accessed or recently accessed data, for example, than lower levels of cache memory.

Cache memory 238 of memory sub-system controller 115 can be used to store tag metadata record 244. A record, such as a tag metadata record 244, can refer to a particular data structure used to store one or more pieces of data as entries. The record can include one or more entries. In some embodiments, each entry of the tag metadata record 244 can correspond to a particular tag metadata (also referred to as "tag" herein). A tag can be associated with a particular cache line (described below) and can identify information about the associated cache line. For example, each tag can include a particular number of bits (e.g., 79 bits) and stored information on whether on the sectors (described below) of a cache line include clean or dirty data. Dirty data can refer to data that is stored in cache memory 234 but does not match the corresponding data stored at backend memory 236. Clean data can refer to data that is stored in cache memory 234 and matches the corresponding data stored at backend memory 236. In other embodiments, one or more of the tag metadata record 244 or the data stored therein (e.g., the data itself or what the data indicates) can be stored at a different component of memory sub-system 110 or host system 120. In some embodiments, the data stored at tag metadata record 244 can be indicative of other aspects of memory sub-system 110, and in particular indicative of different aspects of data written to cache lines of cache memory 234 (as described further below).

In some embodiments, cache controller 232, and in particular cache duplication manager 113 can perform the operations described herein. Cache controller 232 can perform an eviction operation to evict data from one or more cache lines of the cache portion 240 of cache memory 234. Cache controller 232 can perform a clean operation to clean one or more cache lines of the write buffer portion 242 of cache memory 234. Cache controller 232 can manage the write data at the cache portion 240 of cache memory 234 and the duplicate copy of the write data at the write buffer portion 242 of cache memory 234. Cache controller 232 can manage the tag metadata record 244 and write buffer record 246. Cache controller 232 can also manage data of cache memory 234 responsive to a detection of an unrecoverable error in the data stored at cache memory 234. The cache controller 232 can include cache policies to determine data from the backend memory 236A-N to be cached at the cache memory 234 for quick access of the data by the host system 120. The cache controller 232 can write dirty cache lines of the cache memory 234 back to the backend memory 236A-N to ensure the data is maintained at the backend memory 236A-N is valid data.

Memory sub-system controller 115, and in particular cache controller 232 can be coupled to cache memory 234 using one or more channels, illustrated by channel 0 (CH0) and channel 1 (CH1). A channel can refer to a physical coupling used to transmit data. In some embodiments, the channels can be used to perform parallel operations on cache memory 234. In some embodiments, the two channels can be coupled to different DIMMs, different discrete memory devices (e.g., memory devices 140), or different die of a discrete memory device (e.g., packaged in its own device package), for example.

Memory sub-system 110 can include cache memory 234. In some embodiments, cache memory 234 can include volatile memory, such as memory device 140 of FIG. 1. In some embodiments, cache memory 234 can include DRAM. In some embodiments, cache memory 234 can include one or more discrete memory devices.

In some embodiments, cache memory 234 can be partitioned into different portions, such as a cache portion 240 and a write buffer portion 240. The cache portion 240 can store data for a read operation or from a write operation. The data in the cache portion 240 can persist for relatively long periods of time before being (re-)written to backend memory 236A-N (generally referred to as "backend memory 236"). The write buffer portion 242 can be used to store duplicate copies of data stored at cache portion 240, and in particular duplicate copies of write data (e.g., data written to the cache portion 240 as a result of a write operation or data retrieved from the backend memory 236 and re-written at cache memory 234).

In some embodiments, the write buffer portion 242 can be partitioned dynamically and from the pool of cache lines of the cache portion 240. For example, when a duplicate copy of write data is to be stored at the write buffer portion, the cache controller 232 can determine whether the write buffer portion 242 has adequate memory space to store the duplicate copy of the data. If the cache controller 232 determines that there is not adequate memory space at the write buffer portion 242 of cache memory 234, cache controller 232 can allocated a unit of cache memory (e.g., a cache line) from the cache portion 240 of cache memory 234 to the write buffer portion 242. In some embodiments, the cache controller 232 can determine the one or more units of cache memory of the write buffer portion 242 are no longer being used (e.g., cleaned) and responsive to the determination can allocate the unused units of cache memory back to the cache portion 240 of the cache memory 234.

In some embodiments, data written to the cache portion 240 can be written using a first channel (e.g., CH0). The duplicate copy of the data that is written to the write buffer portion 242 can be written on a second channel (CH1) different from the first. If the channels are associated with different discrete devices or even different die of the same discrete device, data that is compromised (e.g., uncorrectable) on the first channel can be recovered using the duplicate copy of the data accessible via the second channel.

In some embodiments, cache memory 234 can be divided into different units. In some instances, the units can correspond to an operational specification of the cache memory 234 or operational specification of the processing device of the host system 120. A cache line can refer to a unit of cache memory and contain multiple bytes and/or words of data. In an exemplary embodiment, the cache line can include 4,096 bytes of data or can correspond to a page size of the cache memory, a row of DRAM, or a logical unit of bytes in DRAM that is allocated by a virtual memory manager. In some embodiments, a cache line can be subdivided into smaller units of memory, such as a sector. For example, a sector can include 64 bytes. A cache line can include a set of sectors.

In some embodiments, a write buffer record 246 can be stored at cache memory 234, and in particular at write buffer portion 242 of cache memory 234. In some embodiments, a write buffer record 246 can include one or more entries. An entry of the write buffer record 246 can map a location of the duplicate copy of the data (e.g., a sector and/or cache line of the write buffer portion 242 that stores the duplicate copy of the data) to a location of the write data (e.g., sector and/or cache line of the cache portion 240 that stores the write data). For example, the entry can store an identifier of the sector of the write buffer portion 242 and an identifier of the cache line of the write buffer portion 242 that stores the duplicate copy of the data and an identifier of the cache line (e.g., cache line address) and an identifier of the sector (e.g., sector address) of the cache portion 240 that stores the corresponding write data.

In some embodiments, one or more write buffer records 246 can be stored at cache memory 234. For example, one or more write buffer records can be associated with each channel of the cache memory 234. In some embodiments, a single write buffer record 246 can track one or more cache lines of data stored at the cache portion 240 of the cache memory 234. In some embodiments, the write buffer record 246 can be stored at a sector of a cache line at the write buffer portion 242 of the cache memory 234. In other embodiments, one or more of the write buffer record 246 or the data stored therein (e.g., the data itself or what the data indicates) can be stored at a different component of memory sub-system 110 or host system 120. For instance, the data stored at the write buffer record 246 can also be stored (alternatively or in addition to) at tag metadata record 244, and vice versa.

In some embodiments, one or more write buffer records can be used for write data written to a particular channel. For example, a write buffer record A can be used to map (e.g., mapping data or location data) write data (written to channel 0. Write buffer record B can be used to map write data written to channel 1. The duplicate copy of the data can be stored at a different channel the corresponding write data so that if one channel fails, the duplicate copy of the data can be retrieved at another channel. In some embodiments, a write buffer record can be stored at the write buffer portion 242 of the cache memory 234. In some embodiments, a write buffer record can be stored at a different channel than the channel used to store the write data that is mapped by the write buffer record. For example, write data is stored at channel 1. The duplicate copy of the data is stored at channel 0. The write buffer record that maps the write data stored at channel 1 to the duplicate copy of the data stored at channel 0 can also be stored at channel 0. If channel 1 fails, the write buffer record is still accessible at channel 1 so that all the data lost on channel 1 can be mapped to respective duplicate copies of the data stored at channel 0 using the write buffer record also stored at channel 0.

In some embodiments, memory sub-system 110 can include backend memory 236A-236N. In some embodiments, backend memory 236A-236 can include memory device(s) 130 as described with respect to FIG. 1. In some embodiments, backend memory 236 can include non-volatile memory such as, but not limited to, 3D cross-point or NAND memory. In some embodiments, the backend memory 236A-N can be a type of memory with a larger capacity and higher access latency than the cache memory 234.

Figure 3:
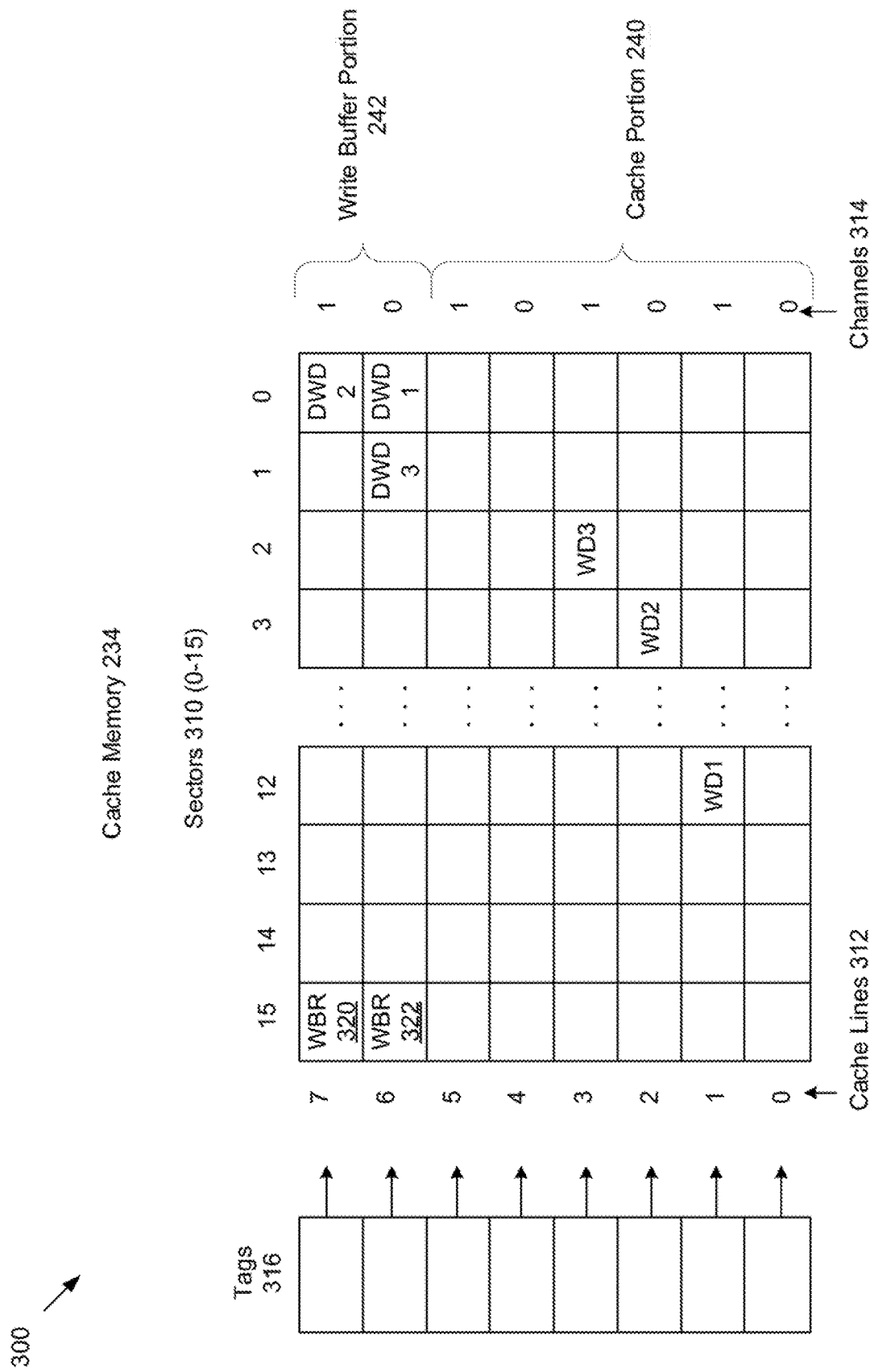
FIG. 3 illustrates cache memory, write buffer records and tag metadata, in accordance with embodiments of the disclosure.

FIG. 3 illustrates cache memory, write buffer records and tag metadata, in accordance with embodiments of the disclosure. Elements of FIG. 1 and FIG. 2 can be described below to help illustrate aspects of diagram 300. It can be understood that the number of elements (e.g., cache lines, sectors, channels, tags, etc.) and position of elements (e.g., position of cache lines of write buffer portion 242 or cache portion 240) are provided for purposes of illustration, rather than limitation. Aspects of the disclosure can be applied to memory sub-systems, and in particular cache memory of memory sub-systems, having any number of elements (e.g., any number of cache lines, channels, sectors, etc.). It can be understood that one or more of the operations described as being performed by cache controller 232 can be performed by cache duplication manager 113 of cache controller 232.

Diagram 300 illustrates cache memory 234 in accordance with some embodiments. Cache memory 234 is illustrated having cache lines 312 illustrated as cache lines 0-7. One or more of the cache lines 312 can be divided into sectors, represented by sectors 310. Diagram 300 illustrates sectors 0-15 for each of the cache lines 312. Each of the cache lines 312 is associated with a particular one of the channels 314. Diagram 300 illustrates channel 0 and channel 1. One or more of the cache lines 312 can be associated with tag metadata 316. Diagram 300 illustrates tag metadata associated with each of the cache lines 312. Cache memory 234 is illustrated as partitioned into write buffer portion 242 and cache portion 240. Write buffer portion 242 includes cache lines 6 and 7. Cache portion 240 includes cache lines 0-5.

In some embodiments, host system can send a request to memory sub-system 110 to perform a write operation to write data at memory sub-system 110. In some embodiments, cache controller 232 can store the data (WD1) at a sector (e.g., sector 12) of a cache line (e.g., cache line 1) of the cache portion 240 of the cache memory 234 of the memory sub-system 110. The write data is represented as WD1 in sector 12 of cache line 1. In some embodiments, cache line 1 is associated with a particular channel, illustrated as channel 1.

In some embodiments, cache controller 232 can determine that a duplicate copy of the data stored at sector 12 of cache line 1 is to be stored at the write buffer portion 242, and in particular at a cache line of the write buffer portion 242 that is associated with a different channel (e.g., channel 0) than the cache line (e.g., channel 1) at which the write data (WD1) is stored. If a cache line at the appropriate channel (e.g., channel 0) of the write buffer portion 242 has not been allocated or is full, cache controller 232 allocates a cache line at the appropriate channel to the write buffer portion 242 of cache memory 234. For example, cache controller 232 allocates cache line 6 associated with channel 0 to write buffer portion 242 of cache memory 234. Responsive to determining that an appropriate cache line at the write buffer portion 242 of cache memory 234 has been allocated, cache controller 232 stores the duplicate copy of the data (DWD1) at a sector (sector 0) of the cache line (cache line 6) of the write buffer portion 242 of the cache memory 234. As illustrated, the duplicate copy of the data, represented by DWD1, is stored at sector 0 of cache line 6 of the write buffer portion 242 of cache memory 234.

In some embodiments, responsive to storing the duplicate copy of the data (DWD1) at the write buffer portion 242 of cache memory 234, cache controller 232 records an entry in the write buffer record 322 that maps the sector (e.g., sector 1) that stores the duplicate copy of the data (DWD1) and the cache line (cache line 6) to cache line 1 and sector 12 of cache line 1 that stores the write data (WD1).

In some embodiments, a write buffer record can be used to store one or more cache lines worth of data. For example, a write buffer record 320 can be used to store information for all the cache lines of cache portion 240 of cache memory 234 associated with channel 0 (e.g., cache lines 0, 2, and 4). Write buffer record 322 can be used to store data for all the cache lines of cache portion 240 of cache memory 234 associated with channel 1 (e.g., cache lines 1, 3, and 5). In another example, multiple write buffer records can be used store information for all the cache lines of the cache portion 240 associated with a particular channel. In some embodiments, a write buffer record can be associated with a particular channel of the memory sub-system.

In some embodiments, responsive to writing data WD1 to sector 12 of cache line 1, cache controller 232 can update the tag metadata associated with cache line 1 to indicate that the data stored at sector 12 of cache line 1 includes dirty data. Responsive to writing the duplicate copy of write data DWD1 to sector 0 of cache line 6, cache controller 232 can repurpose the tag metadata associated with a cache line (e.g., cache line 6) of the write buffer portion 242. Rather than recording whether the data of the cache line is clean or dirty, the tag metadata associated with a cache line of the write buffer portion 242 can be used to indicate whether the duplicate copy of the data stored at the cache line is valid or invalid. For example, the tag metadata associated cache line 6 can indicate that the duplicate copy of the data (DWD1) stored at sector 0 of cache line 6 is valid data because it has just been written and is the most recent version of the data.

Diagram 300 also illustrates additional write data stored at the cache portion 240 of cache memory 234. For example, host system can request the memory sub-system to perform a write operation to store data (WD2) at memory sub-system 110. Cache controller 232 can store the data at cache line 2 sector 3 on channel 0. Cache controller 232 can determine whether a cache line has been allocated to the write buffer portion 242 of cache memory 234 on a different channel, e.g., channel 1. If cache controller 232 determines that a cache line on channel 1 has not been allocated to the write buffer portion 242, cache controller 232 allocates a cache line, e.g., cache line 7 to the write buffer portion 242. Cache controller 232 stores the duplicate copy of the data (DWD2) at sector 0 of cache line 7 on channel 1. The write buffer record 320 that is associated with channel 1 of the cache memory 234 is updated with the mapping data, the tag metadata associated with cache line 2 is updated to indicate that the write data stored at sector 3 of cache line 2 is dirty data, and the tag metadata associated with cache line 7 is repurposed to indicate that the duplicate copy of the data (stored at sector 0 cache line 7) is valid data.

Diagram 300 also illustrates a further additional write data (WD3) stored at section 3 of cache line 3. Cache controller 232 can perform similar operations as described above with respect to storing the duplicate copy of the data (DWD3) and updating the write buffer record 322, tag metadata associated with cache line 3, and tag metadata associated with cache line 6. The similar operations will not be repeated here for the sake of brevity. It can be noted that since the write data (WD3) is written to channel 1 and the write buffer portion 242 has free space associated with channel 0, that cache controller 232 need not allocate a new cache line to the write buffer portion 242 of cache memory 234 and can use cache line 6 to store the new duplicate copy of the data.

Write buffer record 322 associated with channel 0 and write buffer record 320 associated with channel 1 can be used to help perform one or more memory operations, including, but not limited to a data recovery operation, an eviction operation, or a clean operation. In some embodiments, the write buffer record 322 or write buffer record 320 can be used alone or in conjunction with the tag metadata record to perform the memory operations.

In some embodiments, memory sub-system 110 (e.g., cache controller 232) receives a request to perform a read operation to read data stored (e.g., at a sector of a cache line of the cache portion 240) at the cache portion 240 of the cache memory 234. For example, host system 120 requests to perform a read operation to read data WD2 stored at cache line 2. The cache line 2 of the cache portion 240 can be associated with a particular channel, for example, channel 0. Cache controller 232 can detect that the data from the cache line 2 of the cache portion 240 is unrecoverable (e.g., detects an unrecoverable error at the cache line 2 of the cache portion 240). For example, the particular sector 3 of the cache line 2, the entire cache line 2, or the entire channel 0 can fail, making the requested data unrecoverable. Responsive to detecting the unrecoverable error, cache controller 232 identifies the duplicate copy of the data (DWD2) stored at sector 0 of a cache line 7 of the write buffer portion 242 of the cache memory 234. The duplicate copy of the data (DWD2) is stored at a different channel than the original write data. The duplicate copy of the data (DWD2) can be identified using the corresponding entry of the write buffer record 320, also stored at channel 1. Cache controller 232 can search write buffer record 320 for the sector identifier and cache line identifier for the write data (WD2) being requested by the host system 120. The write buffer record 320 maps the sector identifier and cache line identifier for the write data (WD2) to the cache line identifier and sector identifier (e.g., cache line 7, sector 0) of the corresponding duplicate copy of the data. Cache controller 232 can use the duplicate copy of the data to respond to the request to perform a read operation. In some embodiments, the cache controller 232 can write the duplicate copy of the data to backend memory 236. In some embodiments, if the entire channel (e.g., channel 0) has failed, cache controller 232 can read all entries of write buffer record 320 associated with channel 1, locate the duplicate copies of data (duplicates of write data stored at channel 0) and write the duplicate copies of the data to the backend memory 236.

In some embodiments, the cache controller 232 can perform an eviction operation to remove data from one or more cache lines of the cache portion 240 of the cache memory 234. Responsive to performing the eviction operation, cache controller 232 erases the corresponding entries in the write buffer record that map to the cache line of the cache portion 240 that was evicted. For example, the data from cache line 1 of the cache portion 240 can be evicted. Cache controller 232 can identify write buffer record 322 and identify the entry that points to WD1 and erase the entry from write buffer record 322.

In some embodiments, the cache controller 232 can perform a clean operation that erases data from one or more cache lines of the write buffer portion 242 of the cache memory 234. For example, to perform a clean operation cache controller 232 erases cache line 7 and removes the duplicate copy of the data (DWD2) from sector 0 of cache line 7. A clean operation can be performed when the write buffer portion 242 reaches a data capacity threshold or the data of a cache line of the write buffer portion 242 satisfies a data age threshold. Cache controller 232 can identify the corresponding write buffer record, e.g., write buffer record 320, and identify the location of corresponding write data (e.g., WD2) stored in cache portion 240 of cache memory 234 using the mapping data of the write buffer record 320. Cache controller 232 can store the corresponding write data at backend memory 236 so that a duplicate copy of the write data is stored at the memory sub-system 110. Cache controller 232 can erase the corresponding entry of the write buffer record 320.

In some embodiments, metadata tags associated with cache lines of the write buffer portion 242 can be used to store additional data. For example, the bits of a metadata tag can be used as mapping data to map the location (as least in part) of the duplicate copy of the data to the location of the write data stored at the cache portion 240 of the cache memory 234. The metadata tag can be encoded to identify one or more of the sector of the duplicate copy of the data, the cache line of the corresponding write data, or the sector of the corresponding write data. Since the metadata tag is associated with a particular cache line of the write buffer portion 242, the cache line of the duplicate copy of the data need not be encoded to the metadata tag (but can be inferred by association).

In an illustrative example, the metadata tag can have 79 bits. The metadata tag is associated with cache line 6. The cache lines associated with channel 0 can be identified by numbers 0-3, and the cache lines associated with channel 1 can be identified by numbers 0-3. For instance, cache line 0, 2, 4, and 6 of channel 0 can be associated with numbers 0-3, respectively, and cache lines 1, 3, 5, and 7 of channel 1 can be associated with numbers 0-3, respectively. Thus, any cache line associated with a particular channel can be represented by 2 bits. 32 bits of the metadata tag can be used to represent the mapping data identifying the cache lines at which the write data is stored for all 16 sectors of the duplicate copies of the data stored at cache line 6 of the write buffer portion 242. For instance, tag metadata of cache line 6 of channel 1 corresponds to write data stored on cache lines of channel 0. The 2 bits (e.g., most significant bits) of the tag metadata can correspond to duplicate copy of data DWD1 based on the encoded position. The 2 bits can identify cache line 1 (which has been renumbered to cache line 0 to reduce the number of encoding bits). The next two bits of the tag metadata can correspond to duplicate copy of data DWD3 based on the encoded position The bits can identify cache line 3 (which has been renumbered to cache line 1), and so forth. In some embodiments, the cache controller 232 can store the tag metadata at a higher level of cache memory (e.g., cache memory 238) than the write buffer record to allow for quick access to such information. For example, cache controller 232 can quickly read the tag metadata record 244 and determine which cache lines of the cache portion 240 of cache memory 234 have duplicate copies of data stored at the write buffer portion 242. The cache controller 232 can then use the write buffer record 322 to determine the particular sectors of the cache lines of the cache portion 240 that store the write data. In other embodiments, the metadata tag can be used to represent the mapping data identifying the cache lines and sectors at which the write data is stored for all 16 sectors of the duplicate copies of the data stored at cache line 6 of the write buffer portion 242. The cache controller 232 can use the tag metadata to perform the operations described herein.

In some embodiments, the type of mapping data stored at the metadata tag can depend on the number of channels, the number of sectors, the number of cache lines in a cache memory 234, and the available bits of the tag metadata. For example, for cache memory having 2 channels, 16 cache lines, and 16 sectors per cache line, 3 bits are used to encode each cache line and 4 bits are used to encode each sector. 112 bits of tag metadata (if available) would be used to map both sector (64 bits) and cache lines (48 bits) of the cache portion 240. For a cache memory having 4 channels, 16 cache lines, and 16 sectors per cache line, 2 bits are used to encode each cache line and 4 bits are used to encode each sector. 96 bits of tag metadata would be used to map both sector (64 bits) and cache lines (32 bits). For a cache memory having 8 channels, 16 cache lines, and 16 sectors per cache line, 1 bit is used to encode each cache line and 4 bits are used to encode each sector. 80 bits of tag metadata would be used to map both sector (64 bits) and cache lines (16 bits).

Elements of FIGS. 1-3 can be described below to help illustrate method 400 and method 500 of FIG. 4 and FIG. 5, respectively. Method 400 and 500 can be performed as one or more operations. It can be noted that method 400 or 500 can be performed in any order and can include the same, different, more, or fewer operations.

Method 400 or 500 can performed by processing logic that can include hardware (circuitry, dedicated logic, etc.), software (e.g., instructions run on a processing device), or a combination thereof. In some embodiments, some or all the operations of method 400 or method 500 can be performed by one or more components of system 100 of FIG. 1 or system 200 of FIG. 2. In other embodiments, one or more operations of method 400 or 500 can be performed by cache duplication manager 113 as described with respect to FIG. 1-3.

Figure 4:
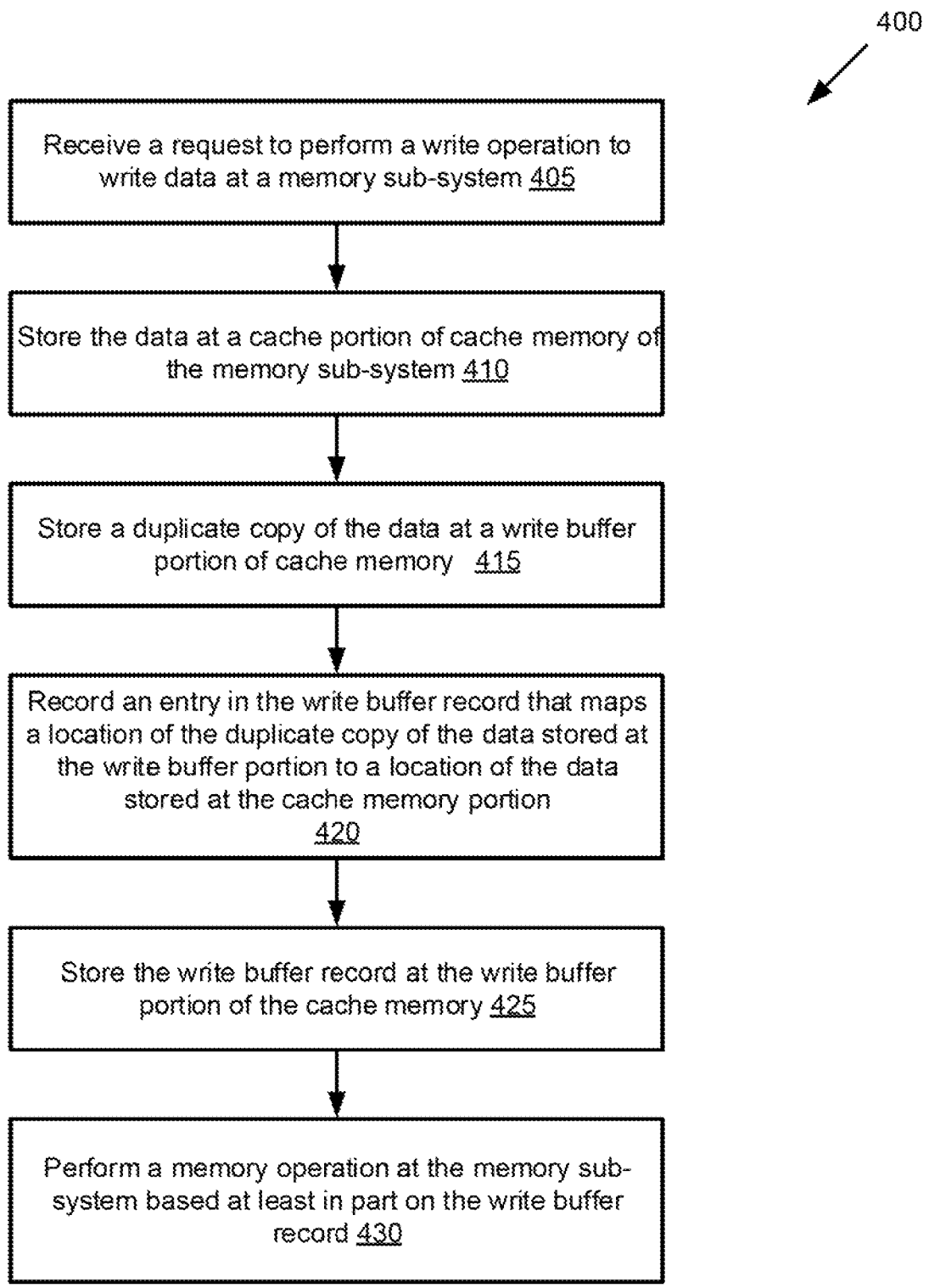
FIG. 4 is a flow diagram of an example method of tracking duplicate copies of data stored a cache memory of a memory sub-system, in accordance with some embodiments of the disclosure.

FIG. 4 is a flow diagram of an example method of tracking duplicate copies of data stored a cache memory of a memory sub-system, in accordance with some embodiments of the disclosure.

At operation 405, processing logic receives a request to perform a write operation to write data at a memory sub-system.

At operation 410, processing logic store the data at a cache portion of cache memory of the memory sub-system. In some embodiments, responsive to the request to perform the write operation, processing logic stores the data at a first sector of a first cache line of a cache portion of cache memory of the memory sub-system.

At operation 415, processing logic stores a duplicate copy of the data at a write buffer portion of cache memory. In some embodiments, processing logic stores a duplicate copy of the data at a second sector of a second cache line of a write buffer portion of cache memory.

In some embodiments, the data is stored at a first cache line of the cache portion that is accessible using a first channel associated with a first memory device of the cache memory. The duplicate copy of the data is stored at a second cache line of the write buffer portion that is accessible using a second channel associated with a second memory device of the cache memory.

At operation 420, processing logic records an entry in the write buffer record that maps a location of the duplicate copy of the data stored at the write buffer portion to a location of the data stored at the cache memory portion.

At operation 425, processing logic stores the write buffer record at the write buffer portion of the cache memory. In some embodiments, processing logic stores the write buffer record at a third sector of a third cache line of the write buffer portion of the cache memory. The third cache line is accessible using the second channel associated with the second memory device.

In some embodiments, processing logic records, at a first tag metadata associated with a first cache line of the cache portion, an indication that the data stored at the first sector of the first cache line of the cache portion of the cache memory is dirty data. Processing logic records, at a second tag metadata associated with a second cache line of the write buffer portion, an indication that the duplicate copy of the data stored at the second sector of the second cache line of the write buffer portion of the cache memory is valid data.

In some embodiments the cache memory is first cache memory. Processing logic records, at a third tag metadata associated with a second cache line of the write buffer portion, an indication that that the first cache stores data that has been duplicated and stored at the second cache line of the write buffer portion. Processing logic stores the second tag metadata at a second cache memory. A level of the second cache memory is a higher level than a level of the first cache memory.

At operation 430, processing logic performs a memory operation at the memory sub-system based at least in part on the write buffer record.

In some embodiments, to perform the memory operation, processing logic receives a request to perform a read operation to read the data stored at a first sector of a first cache line of the cache portion of the cache memory. Processing logic detects an unrecoverable error at the first cache line. Processing logic identifies the duplicate copy of the data stored at a second sector of a second cache line of the write buffer portion of the cache memory based on the entry of the write buffer record. Processing logic sends the duplicate copy of the data stored at the second sector of the second cache line responsive to the request to perform the read operation.

In some embodiments, to perform the memory operation, processing logic performs an eviction operation to remove the data from the first cache line of the cache portion of the cache memory. Responsive to performing the eviction operation, processing logic erases the entry in the write buffer record.

In some embodiments, to perform the memory operation, processing logic performs a clean operation to remove the duplicate copy of the data from the second cache line of the write buffer portion of the cache memory. Processing logic identifies, in the write buffer record, the entry that maps the location of the duplicate copy of the data stored at the write buffer portion to the location of the data stored at the cache portion. Processing logic located the data stored at the first sector of the first cache line of the cache portion of the cache memory based on the entry of the write buffer record. Processing logic stores the data at the first sector of the first cache line at a non-volatile memory device.

Figure 5:
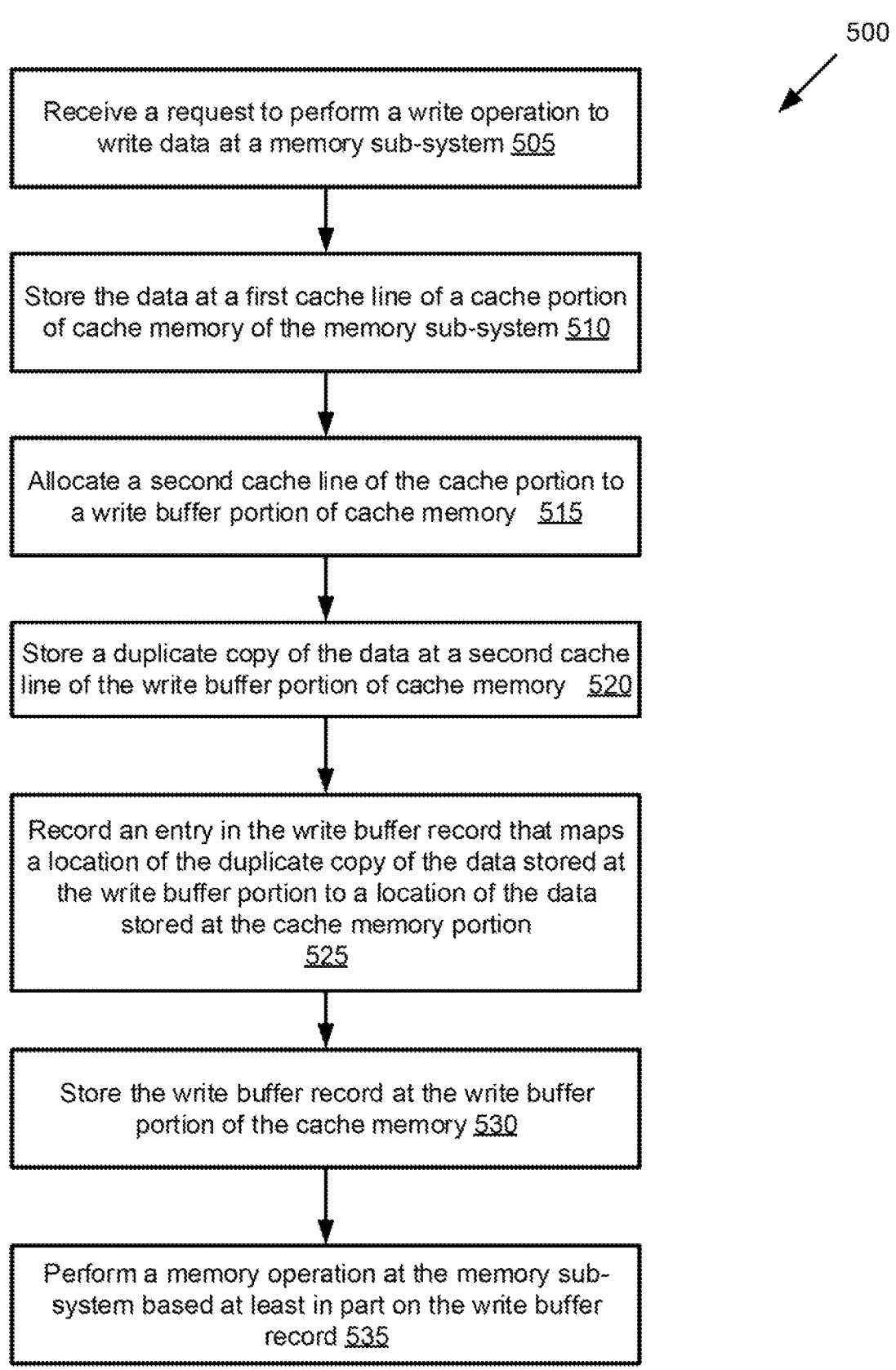
FIG. 5 is a flow diagram of an example method of tracking duplicate copies of data stored a cache memory of a memory sub-system, in accordance with some embodiments of the disclosure.

FIG. 5 is a flow diagram of an example method of tracking duplicate copies of data stored a cache memory of a memory sub-system, in accordance with some embodiments of the disclosure. It can be noted that any of the operations (and embodiments) of method 400 of FIG. 4 can be applied to method 500, and will not be repeated for the sake of brevity.

At operation 505, processing logic receives a request to perform a write operation to write data at a memory sub-system.

At operation 510, processing logic stores the data at a first cache line of a cache portion of cache memory of the memory sub-system. In some embodiments, responsive to the request to perform the write operation, processing logic stores the data at a first sector of a first cache line of a cache portion of cache memory of the memory sub-system. The first cache line of the cache portion is accessible by a first channel.

At operation 515, processing logic allocates a second cache line of the cache portion to a write buffer portion of cache memory. In some embodiments, the second cache line of the write buffer portion is accessible by a second channel.

At operation 520, processing logic stores a duplicate copy of the data at a second cache line of the write buffer portion of cache memory. In some embodiments, the duplicate copy of the data is stored at a second sector of the second cache line.

At operation 525, processing logic records an entry in the write buffer record that maps a location of the duplicate copy of the data stored at the write buffer portion to a location of the data stored at the cache memory portion.

At operation 530, processing logic stores the write buffer record at the write buffer portion of the cache memory.

At operation 535, processing logic performs a memory operation at the memory sub-system based at least in part on the write buffer record.

Figure 6:
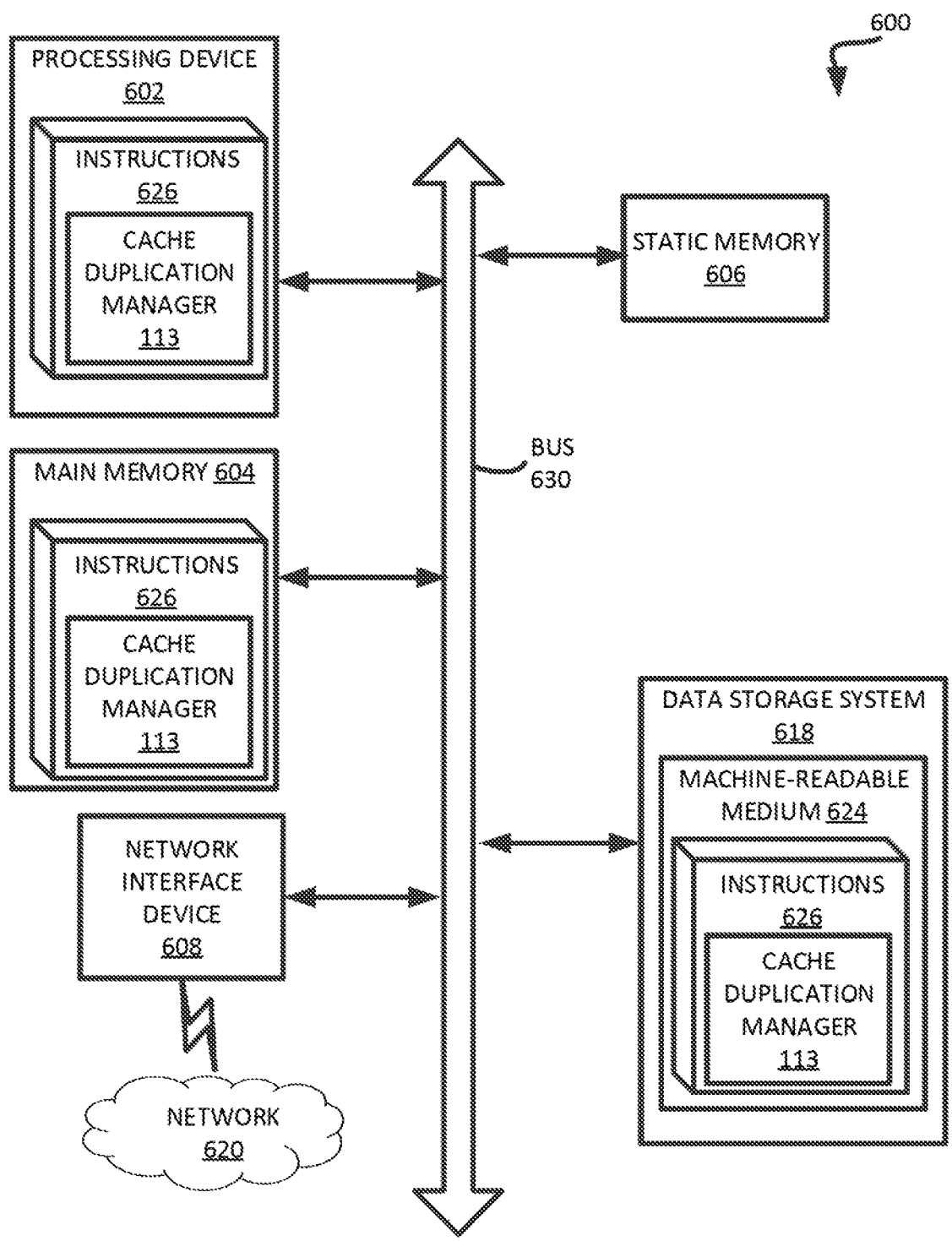
FIG. 6 is a block diagram of an example computer system in which embodiments of the disclosure can operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1 or FIG. 2) that includes, is coupled to, or utilizes a memory sub-system (e.g., the memory sub-system 110 of FIG. 1 or FIG. 2) or can be used to perform the operations of a controller (e.g., to execute an operating system to perform operations corresponding to cache duplication manager 113 of FIG. 1 or FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1 or FIG. 2.

In one embodiment, the instructions 626 include instructions to implement functionality corresponding to cache duplication manager 113 of FIG. 1 or FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the disclosure is not described with reference to any particular programming language. It will be appreciated that a variety of programming languages can be used to implement the teachings of the disclosure as described herein.

The disclosure can be provided as a computer program product, or software, that can include a machine-readable medium having stored thereon instructions, which can be used to program a computer system (or other electronic devices) to perform a process according to the disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an embodiment" or "one embodiment" or "an implementation" or "one implementation" or the like throughout may or may not mean the same embodiment or implementation. One or more embodiments or implementations described herein may be combined in a particular embodiment or implementation. The terms "first," "second," "third," "fourth," etc. as used herein are meant as labels to distinguish among different elements and may not necessarily have an ordinal meaning according to their numerical designation.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
receiving a request to perform a write operation to write data at a memory sub-system;
responsive to the request to perform the write operation, storing the data at a cache portion of a cache memory of the memory sub-system;
storing a duplicate copy of the data at a write buffer portion of the cache memory;
recording, in a write buffer record, an entry that maps a location of the duplicate copy of the data stored at the write buffer portion to a location of the data stored at the cache portion of the cache memory, wherein the cache memory is partitioned into the cache portion and the write buffer portion; and
performing a memory operation at the memory sub-system based at least in part on the write buffer record.

2. The method of claim 1, wherein performing the memory operation at the memory sub-system based at least in part on the write buffer record comprises:
receiving a request to perform a read operation to read the data stored at a first sector of a first cache line of the cache portion of the cache memory;
detecting an unrecoverable error at the first cache line;
identifying the duplicate copy of the data stored at a second sector of a second cache line of the write buffer portion of the cache memory based on the entry of the write buffer record; and
sending the duplicate copy of the data stored at the second sector of the second cache line responsive to the request to perform the read operation.

3. The method of claim 1, wherein performing the memory operation at the memory sub-system based at least in part on the write buffer record comprises:
performing an eviction operation to remove the data from the cache portion of the cache memory; and
responsive to performing the eviction operation, erasing the entry in the write buffer record.

4. The method of claim 1, wherein performing the memory operation at the memory sub-system based at least in part on the write buffer record comprises:
performing a clean operation to remove the duplicate copy of the data from the write buffer portion of the cache memory;
identifying, in the write buffer record, the entry that maps the location of the duplicate copy of the data stored at the write buffer portion to the location of the data stored at the cache portion;
locating the data stored at the cache portion of the cache memory based on the entry of the write buffer record; and
storing the data at a non-volatile memory device.

5. The method of claim 1, wherein the data is stored at a first cache line of the cache portion that is accessible using a first channel associated with a first memory device of the cache memory, and wherein the duplicate copy of the data is stored at a second cache line of the write buffer portion that is accessible using a second channel associated with a second memory device of the cache memory.

6. The method of claim 5, further comprising:
storing the write buffer record at a third sector of a third cache line of the write buffer portion of the cache memory, wherein the third cache line is accessible using the second channel associated with the second memory device.

7. The method of claim 1, further comprising:
recording, at a first tag metadata associated with a first cache line of the cache portion, an indication that the data stored at the first cache line of the cache portion of the cache memory is dirty data; and
recording, at a second tag metadata associated with a second cache line of the write buffer portion, an indication that the duplicate copy of the data stored at the second cache line of the write buffer portion of the cache memory is valid data.

8. The method of claim 1, wherein the cache memory is a first cache memory, the method further comprising:
recording, at a third tag metadata associated with a second cache line of the write buffer portion, an indication that a first cache line of the cache portion stores data that has been duplicated and that is stored at the second cache line of the write buffer portion; and
storing a second tag metadata at a second cache memory, wherein a level of the second cache memory is a higher level than a level of the first cache memory.

9. A non-transitory computer-readable medium comprising instructions that, responsive to execution by a processing device, cause the processing device to perform operations comprising:
receiving a request to perform a write operation to write data at a memory sub-system;
responsive to the request to perform the write operation, storing the data at a first cache line of a cache portion of a cache memory of the memory sub-system, wherein the first cache line of the cache portion is accessible by a first channel;
allocating a second cache line of the cache portion of the cache memory to a write buffer portion of the cache memory, wherein the second cache line of the write buffer portion is accessible by a second channel;
storing a duplicate copy of the data at a second cache line of the write buffer portion of the cache memory; and
recording, in a write buffer record, an entry that maps a location of the duplicate copy of the data stored at the write buffer portion to a location of the data stored at the cache portion of the cache memory, wherein the cache memory is partitioned into the cache portion and the write buffer portion.

10. The non-transitory computer-readable medium of claim 9, wherein the first channel is associated with a first memory device of the cache memory, and wherein the second channel is associated with a second memory device of the cache memory.

11. The non-transitory computer-readable medium of claim 10, the operations further comprising:
storing the write buffer record at a third sector of a third cache line of the write buffer portion of the cache memory, wherein the third cache line is accessible using the second channel associated with the second memory device.

12. The non-transitory computer-readable medium of claim 9, the operations further comprising:
performing a memory operation at the memory sub-system based at least in part on the write buffer record.

13. The non-transitory computer-readable medium of claim 12, wherein performing the memory operation at the memory sub-system based at least in part on the write buffer record, the operations further comprising:

receiving a request to perform a read operation to read the data stored at the first cache line of the cache portion of the cache memory;

detecting an unrecoverable error at the first cache line;

identifying the duplicate copy of the data stored at the second cache line of the write buffer portion of the cache memory based on the entry of the write buffer record; and sending the duplicate copy of the data stored at the second cache line responsive to the request to perform the read operation.

14. The non-transitory computer-readable medium of claim 12, wherein performing the memory operation at the memory sub-system based at least in part on the write buffer record, the operations further comprising:

performing an eviction operation to remove the data from the first cache line of the cache portion of the cache memory; and responsive to performing the eviction operation, erasing the entry in the write buffer record.

15. The non-transitory computer-readable medium of claim 12, wherein performing the memory operation at the memory sub-system based at least in part on the write buffer record, the operations further comprising:

performing a clean operation to remove the duplicate copy of the data from the second cache line of the write buffer portion of the cache memory;

identifying, in the write buffer record, the entry that maps the location of the duplicate copy of the data stored at the write buffer portion to the location of the data stored at the cache portion;

locating the data stored at the first cache line of the cache portion of the cache memory based on the entry of the write buffer record; and storing the data of the first cache line at a non-volatile memory device.

16. A system, comprising:

a cache memory; and a processing device, operatively coupled to the cache memory, to perform operations comprising:

receiving a request to perform a write operation to write data at a memory sub-system;

responsive to the request to perform the write operation, storing the data at a cache portion of cache memory of the memory sub-system;

storing a duplicate copy of the data at a write buffer portion of cache memory;

recording, in a write buffer record, an entry that maps a location of the duplicate copy of the data stored at the write buffer portion to a location of the data stored at the cache portion of the cache memory, wherein the cache memory is partitioned into the cache portion and the write buffer portion; and performing a memory operation at the memory sub-system based at least in part on the write buffer record.

17. The system of claim 16, wherein performing the memory operation at the memory sub-system based at least in part on the write buffer record, the operations comprising:

receiving a request to perform a read operation to read the data stored at a first sector of a first cache line of the cache portion of the cache memory;

detecting an unrecoverable error at the first cache line;

identifying the duplicate copy of the data stored at a second sector of a second cache line of the write buffer portion of the cache memory based on the entry of the write buffer record; and sending the duplicate copy of the data stored at the second sector of the second cache line responsive to the request to perform the read operation.

18. The system of claim 16, wherein performing the memory operation at the memory sub-system based at least in part on the write buffer record, the operations comprising:

performing an eviction operation to remove the data from the cache portion of the cache memory; and responsive to performing the eviction operation, erasing the entry in the write buffer record.

19. The system of claim 16, wherein performing the memory operation at the memory sub-system based at least in part on the write buffer record, the operations comprises:

performing a clean operation to remove the duplicate copy of the data from the write buffer portion of the cache memory;

identifying, in the write buffer record, the entry that maps the location of the duplicate copy of the data stored at the write buffer portion to the location of the data stored at the cache portion;

locating the data stored at the cache portion of the cache memory based on the entry of the write buffer record; and storing the data at a non-volatile memory device.

20. The system of claim 16, wherein the data is stored at a first cache line of the cache portion that is accessible using a first channel associated with a first memory device of the cache memory, and wherein the duplicate copy of the data is stored at a second cache line of the write buffer portion that is accessible using a second channel associated with a second memory device of the cache memory.

* * * * *